UNITED STATES PATENT OFFICE.

CHARLES LOWE, OF REDDISH, NEAR STOCKPORT, COUNTY OF LANCASTER, ENGLAND.

MANUFACTURE OF DERIVATIVES OF AURINE.

SPECIFICATION forming part of Letters Patent No. 316,471, dated April 28, 1885.

Application filed January 31, 1885. (Specimens.) Patented in England November 22, 1882, No. 5,554.

*To all whom it may concern:*

Be it known that I, CHARLES LOWE, a subject of the Queen of Great Britain, residing at Reddish, near Stockport, in the county of Lancaster, England, manufacturing chemist, have invented a certain new and useful Improvement in Coloring-Matters Derived from Coal-Tar Products, (for which I have obtained Letters Patent in Great Britain, No. 5,554, dated November 22, 1882;) and I do hereby declare that the following is a full, clear, and exact description of the invention, which will enable others skilled in the art to which it appertains to make and use the same.

The object of my invention is to manufacture a basic red coloring-matter which I designate "roso-phenoline" from the product well-known to chemists generally under the names of "aurine" or "yellow coralline."

To carry my invention into effect I heat to a temperature between two hundred and twelve degrees Fahrenheit and four hundred degrees Fahrenheit (212° and 400° Fahrenheit) the aurine with a mixture or combination of ammonia and an organic acid either in aqueous, ethylic, phenylic, or other alcoholic solution either in open vessels at ordinary atmospheric pressure or in closed vessels at a pressure superior to ordinary atmospheric pressure until the aurine is converted into the red coloring-matter named. By preference I employ benzoic acid, although other organic acids may be satisfactorily substituted for it in the mixture or combination above described. The duration of the operation will vary with the quantities of material and the degree of pressure employed.

The following proportions will give a good result, although they may be considerably varied without materally affecting the economy and successful working of the process, as will be understood by all chemists: aurine, one part; aqueous, ethylic, phenylic, or other alcoholic solution of ammonia, ten parts; benzoic or other organic acid, one part. The basic red coloring-matter thus produced is obtained in a crystalline form and, combined with acids, forms salts of a crystalline nature—green by reflected light and red by transmitted light—which salts are insoluble in benzole, but soluble in alcohol or water, the latter solution dyeing silk or wool in red shades of color varying from pink to crimson. This coloring-matter is purified for the market either in its basic state or converted into a salt, as above stated, by any of the general processes well known and applied by all chemists for similar purposes.

Having fully described my invention, I declare that what I desire to claim and secure by Letters Patent of the United States is—

The crystalline basic red coloring-matter herein described, which, in combination with acids, forms crystalline salts—green by reflected light and red by transmitted light—said salts being insoluble in benzole, but soluble in alcohol or water, the latter solution dyeing silk or wool in red shades of color varying from pink to crimson, substantially as set forth.

The foregoing specification of my improvement in coloring-matters derived from coal tar products signed by me this 16th day of January, 1885.

CHAS. LOWE.

Witnesses:
S. W. GILLET,
HERBERT R. ABBEY,
*Both of H. B. Barlow's Office for Patents, 17 St. Ann's Square, Manchester.*